United States Patent [19]

Clegg

[11] Patent Number: 4,469,411
[45] Date of Patent: Sep. 4, 1984

[54] QUADRANT CONICAL-LENS MICROSCOPE

[76] Inventor: John E. Clegg, 2320 Keystone Dr., Orlando, Fla. 32806

[21] Appl. No.: 291,174

[22] Filed: Aug. 10, 1981

[51] Int. Cl.$^3$ .................. G02B 13/18; G02B 21/00
[52] U.S. Cl. ................... 350/414; 350/432; 350/507
[58] Field of Search ............. 350/286, 432, 416, 507

[56] References Cited

U.S. PATENT DOCUMENTS

| | | | |
|---|---|---|---|
| 2,034,096 | 3/1936 | Hauser | 350/507 X |
| 4,277,148 | 7/1981 | Clegg | 350/432 |

*Primary Examiner*—John K. Corbin
*Assistant Examiner*—Scott J. Sugarman

[57] ABSTRACT

The disclosure is a microscope in which magnification is produced by multiple quadrant stages of conical lenses. Conical lenses receive and emit parallel rays of light, and they can be stacked vertically in series to produce multiple magnification which increases at an exponential rate and which extends into the hundreds of thousands and millions.

The rays emitted by the conical lens do not converge and cross as they do with the spherical lens, and there is no inverting of images. It is possible, therefore, to divide the lens into quadrants, that is, into four 90° longitudinal sectors which are cemented together prior to grinding and then separated after grinding. The quadrants are mounted vertically in the microscopic tube to produce images of the same magnification as four whole lenses though in a field of view which is reduced in size to one fourth. Moreover, the quadrants can be rotated into and out of the line of vision, thereby making possible a number of magnification settings equal to the number of quadrants being used. A single-tube four-stage quadrant microscope with stage and eyepiece magnification of 5×　will produce enlarged images of 5×, 25×, 125×, 625× and 3125×. A double-tube, eight-stage quadrant microscope will produce the above enlarged images plus images of 15,625×, 78,125×, 390,625× (hypothetical) and 1,953,125× (hypothetical). The disclosure is the latter.

4 Claims, 4 Drawing Figures

U.S. Patent
Sep. 4, 1984
4,469,411
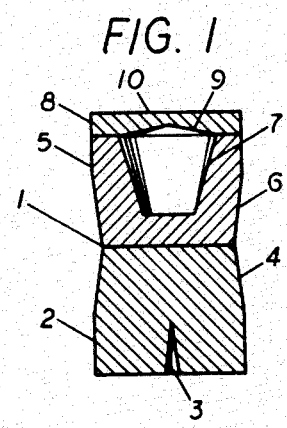
FIG. 1
FIG. 2
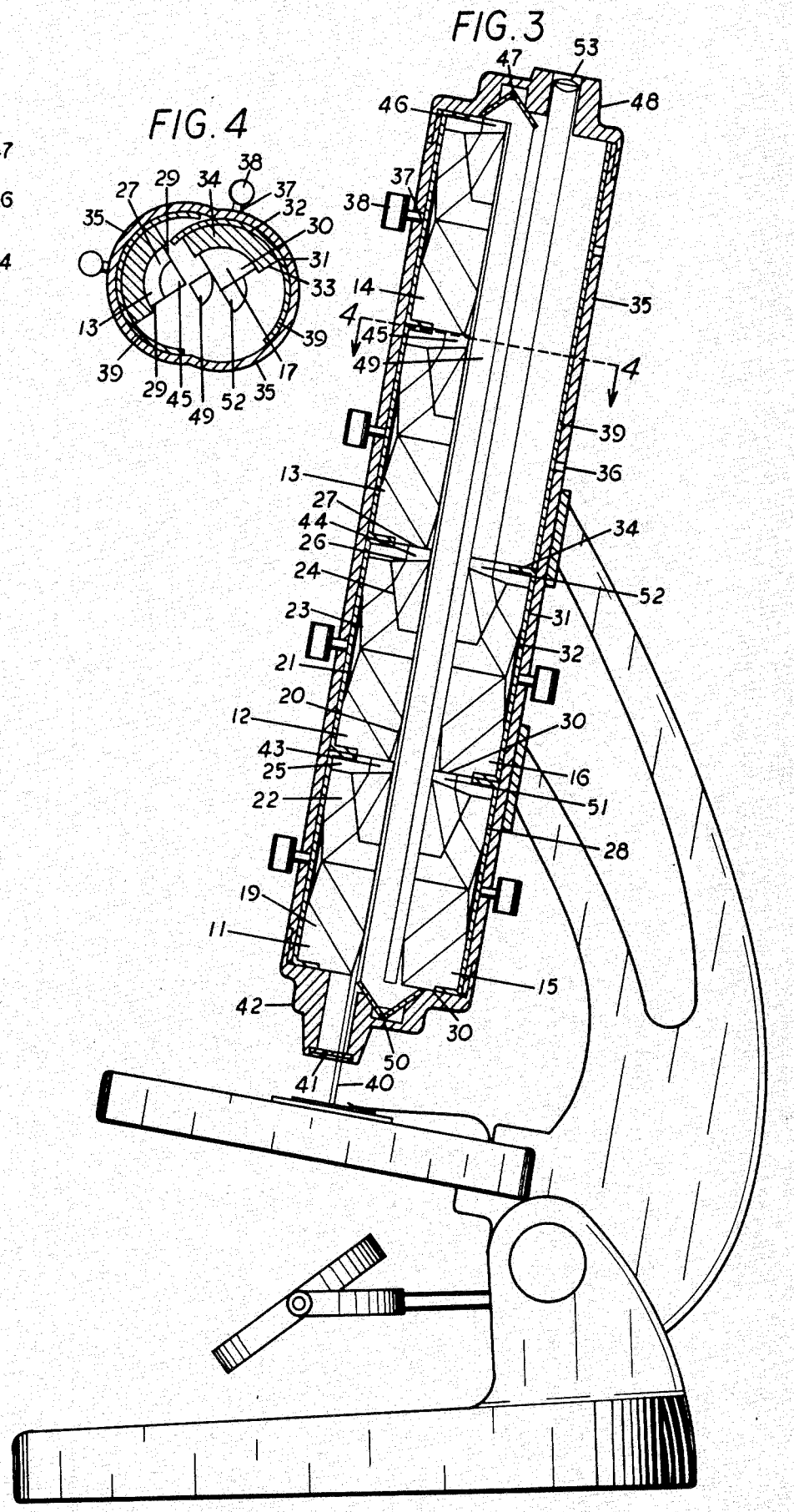
FIG. 3
FIG. 4

4,469,411

QUADRANT CONICAL-LENS MICROSCOPE

BACKGROUND OF THE INVENTION

The invention relates to optical instruments, specifically to conical-lens microscopes.

Multiple magnification is a new concept in optics which was introduced and first published in U.S. Pat. No. 4,277,148, Conical Split-Image Microscopic Lens, dated July 7, 1981, Inventor: John E. Clegg.

SUMMARY OF THE INVENTION

Conical-lens microscopes have a number of advantages over spherical-lens microscopes. There is no focusing; therefore there is no need of a rack and pinion. High fixed working distance between lens and object is possible. There is no turret with mounted achromatic objectives, nor are there separate eyepieces which must be interchanged; instead, the conical lenses and a single eyepiece are mounted inside the microscopic tube, protected from dust, moisture and wear. Conical surfaces are easier to calculate, measure and grind than spherical surfaces. Finally, extremely high magnification is possible, and the clarity and resolution of images is superior to that of spherical-lens microscopes. While it is true that light rays must pass through six separate surfaces of the conical lens for each stage used, and that a certain amount of interference will occur, the interference will be minor when compared to the interference produced at the focal point of high-powered spherical lenses. Images produced by conical lenses will be essentially distortion-free.

A major disadvantage of the conical-lens microscope is that each stage is formed of three component lenses, with a total of six sections (faces) for each stage. The four-stage microscope has a total twenty-four sections, and the eight-stage microscope has twice that number. Production costs would be prohibitive were it not for the savings resulting from the elimination of the rack and pinion, turret, three achromatic lenses, and three separate mounted eyepieces. Also, the use of quadrant lenses will mean that only one whole lens will have to be ground for the four-stage microscope and only two whole lenses for the eight-stage microscope.

DESCRIPTION OF THE DRAWINGS

FIG. 1 is a longitudinal section of a conical stage lens.

FIG. 2 is a cross section of a blank component lens formed of four quadrants prior to grinding.

FIG. 3 is an elevation of a double-tube eight-stage microscope.

FIG. 4 is a cross section taken on line 4—4 of FIG. 3.

DESCRIPTION OF THE PREFERRED EMBODIMENT

FIG. 1 is a longitudinal section of a stage lens 1 consisting of three component lenses; lower component lens 2 with concave conical section 3 and convex conical section 4, middle component lens 5 with convex conical section 6 and concave conical section 7, and upper component lens 8 with concave conical section 9 and planar section 10.

FIG. 2 is a cross section of a blank component lens consisting of four blank quadrants which are cemented together prior to grinding. After being ground and polished, the quadrant lenses are separated, enclosed in metal jackets and mounted in the microscopic tube.

FIG. 3 is a view of an eight-stage quadrant microscope with six visible quadrant stage lenses 11-16 and two quadrant stage lenses 17-18 rotated out of view. Each quadrant stage lens 11-18 consists of three quadrant component lenses; lower quadrant component lens 19 with quadrant concave conical section 20 and quadrant convex conical section 21, middle quadrant component lens 22 with quadrant convex conical section 23 and quadrant concave conical section 24, and upper quadrant component lens 25 with quadrant concave conical section 26 and quadrant planar section 27.

Each quadrant stage lens 11-18 is assembled from lower, middle and upper quadrant component lenses 19, 22 and 25. Each quadrant stage lens 11-18 has a cylindrical wall 28, two plane longitudinal walls 29 extending inward from cylindrical wall 28 to the common axis of the quadrant stage lenses 11-18, where the two plane longitudinal walls 29 abut at an angle of 90°, and two basal end walls 30 located at opposite ends of each quadrant stage lens 11-18.

Each quadrant stage lens 11-18 is mounted in a tubular metal jacket 31, with the inner tubular wall 32 being of the same degree of curvature as cylindrical wall 28, with two plane longitudinal walls 33 enclosing portions of plane longitudinal walls 29, and with two basal end walls 34 enclosing portions of basal end walls 30.

Quadrant stage lenses 11-18 and their jackets 31 are mounted vertically in a single microscopic tube or in a double microscopic tube 35 formed of two adjoined single tubes with the intervening walls removed, as shown in FIGS. 3 and 4. There is a circular slot 36 in the double tube 35 at each level in which a quadrant stage lens 11-18 and its jacket 31 are mounted. Shanks 37 engage jackets 31 and extend laterally through slots 36 to rotating knobs 38, which are the means of rotating quadrant stage lenses 11-18 into and out of the line of vision from outside the double tube 35. The tubular portions 39 of jackets 31 form arcs greater than 180° so as to rotate around the axis of the quadrant stage lenses 11-18 and the central axis of double tube 35.

In operation, parallel rays 40 from the object pass through optical window 41 mounted in lower housing 42 and are refracted by quadrant conical sections 20, 21, 23, 24 and 26 of quadrant stage lens 11. The 1st enlarged image 43 (5×) is emitted by quadrant planar section 27. One fifth of 1st enlarged image 43 is received by quadrant conical section 20 of quadrant stage lens 12, which produces 2nd enlarged image 44 (25×). The 3rd enlarged image 45 (125×) produced by quadrant stage lens 13 is shown in cross section in FIG. 4.

The 4th enlarged image 46 (625×) is produced by quadrant stage lens 14 and is reflected from the top of double tube 35 to the bottom thereof by upper mirrors 47 mounted in upper housing 48. Reflected image 49 is reflected up into quadrant stage lens 15 by lower mirrors 50 mounted in lower housing 42. Quadrant stage lens 15 produces 5th enlarged image 51 (3125×), and quadrant stage lens 16 produces 6th enlarged image 52 (15,625×), which is shown in FIGS. 3 and 4.

Quadrant stage lenses 17 and 18 are rotated out of the line of vision, so 6th enlarged image 52 is received by eyepiece lens 53 which produces 7th enlarged image (78,125×) (not shown).

The apexes of quadrant concave conical sections 20 of lower quadrant component lenses 19 are critical areas in so far as grinding is concerned, and these areas should be avoided when producing multiple magnification. Tubular shims 0.5 mm thick should be placed between quadrant stages 11–13 and 15–17 and jackets 31 to move the apex areas out of the line of vision. Three shims should be placed between quadrant stage lens 11 and its jacket 31, two shims between quadrant stage lens 12 and its jacket 31, and one shim between quadrant stage lens 13 and its jacket 31. The same numbers of shims should be placed between quadrant stages 15–17 and their jackets 31. Other parts will have to be modified to reflect these design changes.

Angles of incidence and refraction are as follows:

|  | $\Theta i$ | $\Theta r$ |
|---|---|---|
| Lower Quadrant Component Lens 19: | | |
| Quadrant Concave Conical Section 20 | 83° | 41.4° |
| Quadrant Convex Conical Section 21 | 41.4° | 83° |
| Middle Quadrant Component Lens 22: | | |
| Quadrant Convex Conical Section 23 | 83° | 41.4° |
| Quadrant Concave Conical Section 24 | 31.9° | 52.5° |
| Upper Quadrant Component Lens 25: | | |
| Quadrant Concave Conical Section 26 | 52.5° | 31.9° |
| Quadrant Planar Section 27 | 0° | 0° |

A table of multiple magnification produced by eight stages and an eyepiece is given below:

| Eyepiece & Quadrant Stage | Magnification |
|---|---|
| Eyepiece only | $5 = 5 \times$ |
| 1st Quadrant Stage Lens 11 | $5^2 = 25 \times$ |
| 2nd Quadrant Stage Lens 12 | $5^3 = 125 \times$ |
| 3rd Quadrant Stage Lens 13 | $5^4 = 625 \times$ |
| 4th Quadrant Stage Lens 14 | $5^5 = 3125 \times$ |
| 5th Quadrant Stage Lens 15 | $5^6 = 15,625 \times$ |
| 6th Quadrant Stage Lens 16 | $5^7 = 78,125 \times$ |
| 7th Quadrant Stage Lens 17 (hypotetical) | $5^8 = 390,625 \times$ |
| 8th Quadrant Stage Lens 18 (hypotetical) | $5^9 = 1,953,125 \times$ |

I claim:

1. A quadrant stage lens comprising three quadrant component lenses;

(a) with each quadrant component lens being a 90° longitudinal sector of a whole component lens, with each quadrant component lens having one or two quadrant concave or convex conical sections which refract light rays at prescribed angles, with all quadrant conical sections being aligned on a common axis which is parallel to the light rays entering and emanating from the quadrant component lenses, with all surfaces of the quadrant component lenses not used for the refraction and transmission of light rays being opaque.

(b) with the quadrant stage lens which is assembled from three quadrant component lenses being bounded by a cylindrical wall, two plane longitudinal walls extending from the cylindrical wall inward to the common axis of the quadrant component lenses, where the two plane longitudinal walls abut at an angle of 90°, and two basal end walls which are perpendicular to the cylindrical wall and the two plane longitudinal walls and which are located at opposite ends of the quadrant stage lens.

2. A tubular metal jacket for mounting of the quadrant stage lens, with the inner tubular wall of the jacket having the same degree of curvature as the cylindrical wall of the quadrant stage lens, with two plane longitudinal walls extending from the inner tubular wall of the jacket inward so as to enclose portions of the two plane longitudinal walls of the quadrant stage lens, with two basal end walls which enclose portions of the two basal end walls of the quadrant stage lens, with the tubular portion of the jacket having the same degree of curvature as the microscopic tube in which it is mounted, and with the tubular portion of the jacket forming an arc larger than 180° so as to be free to rotate around the common axis of the quadrant stage lens and the central axis of the microscopic tube.

3. A single microscopic tube for mounting of quadrant stage lenses and their tubular metal jackets, with the inside diameter of the microscopic tube being equal to the outside diameter of the tubular metal jackets, and with circular slots in the walls of the microscopic tube to provide access to the tubular metal jackets for means of rotating the quadrant stage lenses into and out of the line of vision of the quadrant stage lenses from outside the microscopic tube, with a circular slot being located at each level in the microscopic tube in which a quadrant stage lens is mounted.

4. A double microscopic tube comprising two adjoined single microscopic tubes with intervening walls removed, for mounting of two adjacent rows of quadrant stage lenses and their tubular metal jackets, with the inside diameter of the two adjoined single microscopic tubes being equal to the outside diameter of the tubular metal jackets, and with circular slots in the walls of the double microscopic tube to provide access to the tubular metal jackets for means of rotating the quadrant stage lenses into and out of the line of vision of the quadrant stage lenses from outside the double microscopic tube, with two circular slots being located at each level in the double microscopic tube in which two quadrant stage lenses are mounted.

* * * * *